United States Patent [19]

Itoh et al.

[11] Patent Number: 5,002,205
[45] Date of Patent: Mar. 26, 1991

[54] PRODUCT-DISCHARGING DEVICE OF POWDERY/GRANULAR MATERIAL PROCESSING APPARATUS

[75] Inventors: Shinichi Itoh, Gifu; Masaaki Niwano, Oosaka; Osamoto Nishimura, Kyoto, all of Japan

[73] Assignee: Freund Industrial Co., Ltd., Tokyo, Japan

[21] Appl. No.: 417,742

[22] Filed: Oct. 5, 1989

[30] Foreign Application Priority Data

Oct. 7, 1988 [JP] Japan .................................. 63-253224

[51] Int. Cl.$^5$ .............................................. B67D 5/60
[52] U.S. Cl. .................................... 222/130; 222/160; 222/412; 222/459; 222/564
[58] Field of Search ................... 34/130, 132; 222/160, 222/167, 195, 226, 333, 411, 412, 459, 564

[56] References Cited

U.S. PATENT DOCUMENTS 2,057,526  10/1936  Horton ................................ 34/130
2,720,340  10/1955  Gustafson ........................... 222/564

Primary Examiner—Michael S. Huppert
Assistant Examiner—Pamela Jordan
Attorney, Agent, or Firm—Kane, Dalsimer, Sullivan, Kurucz, Levy, Eisele and Richard

[57] ABSTRACT

A product-discharging device of a powdery/granular material processing apparatus incorporating a rotary pan. The product discharging device extends along an end wall from the vicinity of the rotary pan to the vicinity of an aperture provided at the end wall of the rotary pan. The product-discharging device guides the finished product from the interior of the rotary pan to the aperture and then automatically discharges the finished product out of the apparatus.

4 Claims, 4 Drawing Sheets

PRODUCT-DISCHARGING DEVICE OF POWDERY/GRANULAR MATERIAL PROCESSING APPARATUS

BACKGROUND OF THE INVENTION

1. Field of the Invention

The present invention relates to a powdery/granular material processing apparatus, more particularly, to a technique of discharging powdery/granular products granulated and coated in a rotary pan of the processing apparatus to the outside of the rotary pan.

2. Related Art Statement

Any of those conventional powdery/granular material processing apparatuses using a rotary pan is normally called a pan coating apparatus, which is used for granulation, coating, blending, and drying a variety of powdery/granular materials including medicine and food for example.

Actually, any of these conventional powdery/granular material processing appratuses still have a technical problem to be solved regarding a method of taking out processed products from the rotary pan. The lack of such a method has created a bottleneck in fully automating the process for discharging finished products.

To solve this problem, there is such an apparatus incorporating product-discharging means called a "trap-door" in the rotary pan.

Nevertheless, introduction of the apparatus having the rotary pan incorporating the "trap-door" system results in increased cost. Furthermore, since the system needs to be provided with a container for receiving detergent solution along with a container for receiving finished products, and in addition, due to the needs for allowing insertion of the product-receiving container, the product-discharging port must be provided at a substantial height. This, in turn, expands the entire dimension of the apparatus itself. Furthermore, due to accidental opening of the trap-door, products may fall on the floor.

SUMMARY OF THE INVENTION

Now, therfore, the primary object of the invention is to provide a novel product-discharging device for use with the powdery/granular material processing apparatus capable of fully automating the operation for discharging finished products.

Another object of the invention is to provide a novel product-discharging device which can securely prevent the occurrence of troubles such as pulverization of products or stripping of coated film, and yet, improves sanitary condition and lowers costs for discharging finished products.

A still further object of the invention is to provide a novel product-discharging device having simple structure which, at the time of normal operation (rotating the pan in a normal direction), serves to provide effective granulation, coating, agitation, and drying of powdery/granular material.

The product-discharging device of the powdery/granular material processing apparatus according to the present invention incorporates product-discharging means which extends itself along the end wall portion from the vicinity of the main body of the rotary pan to the vicinity of an aperture provided in the end wall portion.

According to the product-discharging means mentioned above, granular product processed in the rotary pan is led to the aperture by effect of the rotation of the rotary pan and then automatically discharged from the aperture before eventually being stored in a desired container.

DETAILED DESCRIPTION OF THE PREFERRED EMBODIMENTS

Example 1

Figure 1A:
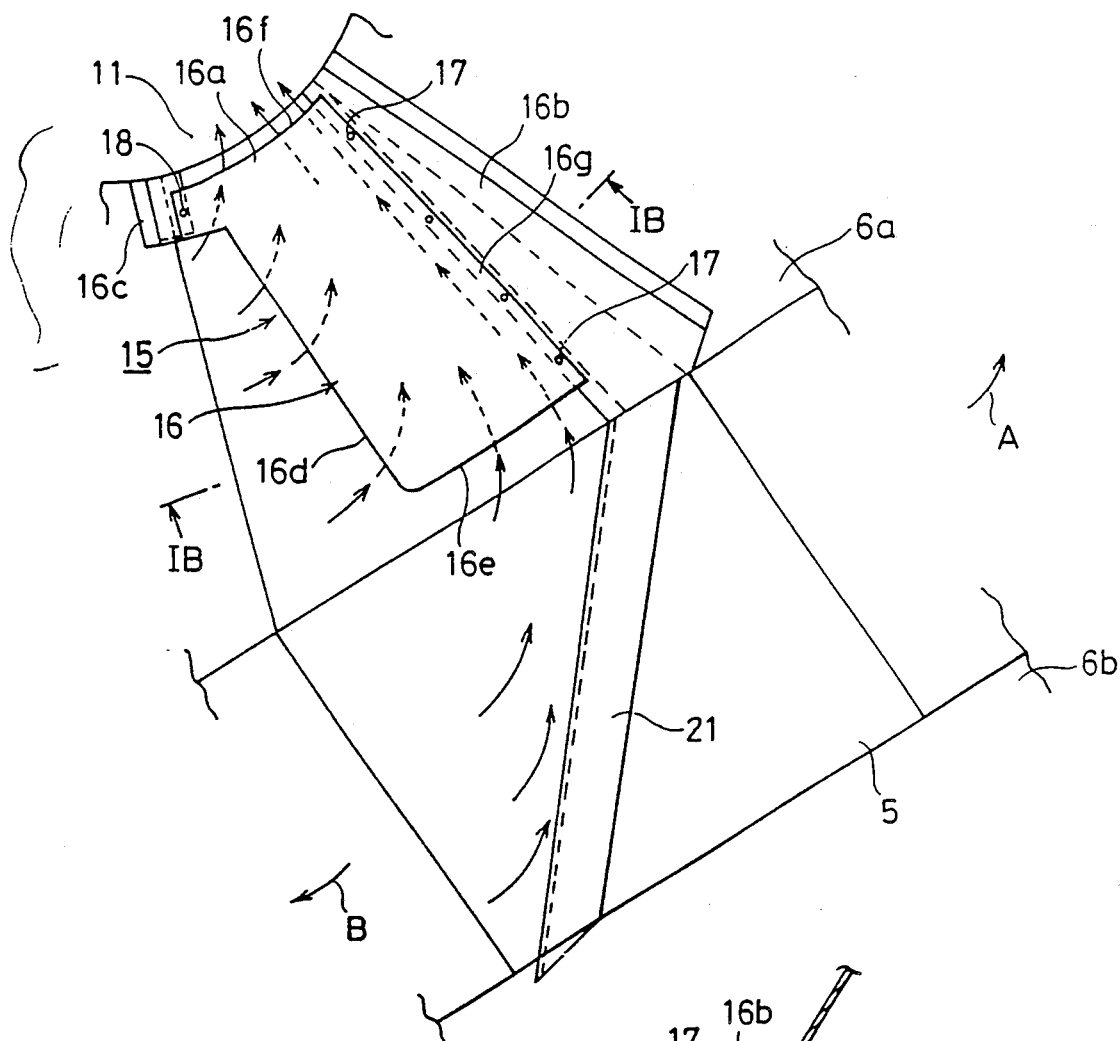
FIG. 1A is an exploded perspective view of a preferred embodiment of the product-discharging device of the powdery/granular material processing apparatus according to the present invention.
Figure 1B:
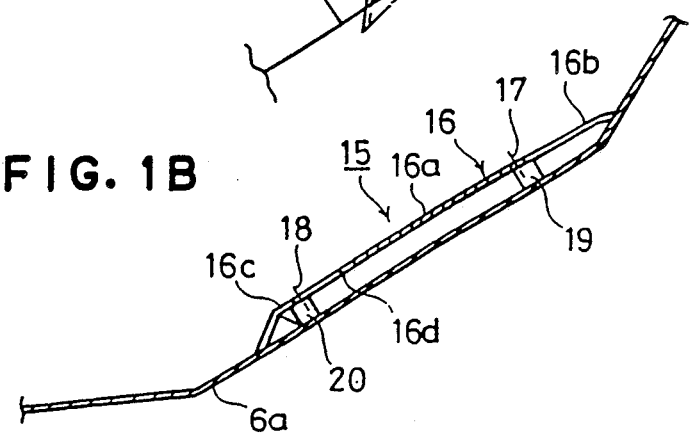
FIG. 1B is a sectional view of the product-discharging device shown in FIG. 1A taken on line IB—IB.
Figure 2:
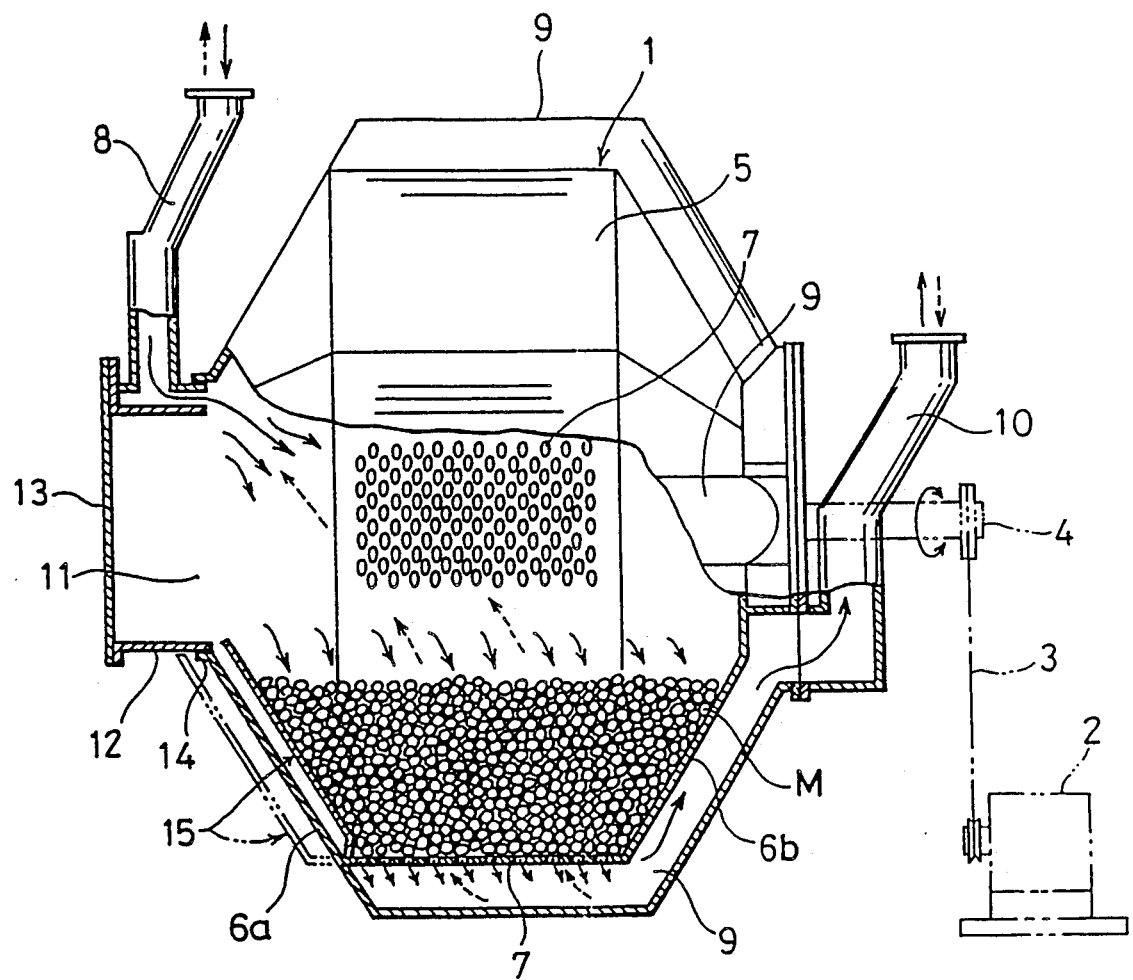
FIG. 2 is an axially-directional section of a powdery/granular material processing apparatus according to the invention.

Referring now to the drawings, FIG. 1A is an exploded perspective view a first embodiment of the product-discharging device of a powdery/granular material processing apparatus according to the invention. FIG. 1B is the sectional view of the product-discharging device shown in FIG. 1A taken on line IB—IB. FIG. 2 is an axially-directional sectional view of a powdery/granular material processing apparatus incorporating the embodiment of FIG. 1A.

The powdery/granular material processing apparatus incorporating the first embodiment is substantially one which is conventionally called a "pan-coating apparatus". The invented product-discharging device is applied to this pan-coating apparatus as an example.

As shown in FIG. 2, the powdery/granular material processing apparatus according to the invention has a horizontally positioned drum-shape coating pan, i.e., a rotary pan 1 which contains powdery/granular material and rotates itself in the normal and inverse directions.

The rotary pan 1 is rotated by a rotary shaft 4 by means of a motor 2 via transmission means 3 like a belt or chain for example, the motor rotating in the normal and inverse directions.

The rotary pan 1 of the present embodiment is composed of a hollow main body 5 having a polygonal or round cylindrical shape in section and end walls 6a and 6b provided at opposite ends of the main body 5 in the axial direction.

Ventilation ports are provided at several locations or along the entire circumference of the main body 5 of the pan. Thus, the hollow main body 5 is provided with a ventilation system in which heated gas or cooling gas supplied from an air-duct 8 into the rotary pan 1 passes through ventilation port 7 to an air-duct 10 which exhausts gas via another air-duct 9. It is also possible to reverse the direction of feeding and exhausting of gas between the duct 8 and duct 10 if required. Thus, as shown in FIG. 2 by means of the solid and broken arrowed lines, the ventilation system can feed and exhaust gas in either direction.

An aperture 11 is provided at about the center of the end wall portion 6a for supplying powdery/granular material and discharging finished product M. The aperture 11 has a mouth portion 12 and a lid 13 that can be opened and closed as required. A rotation-coupling part 14 consists of the end portion (rotating part) of the end wall 6a of the rotary pan 1 and the outer circumference (stationary part) of the mouth portion 12.

Product-discharging means 15 (see FIG. 1A and FIG. 1B) is provided inside of the rotary pan 1 at a position or a plurality of positions, for example, in the circumferential direction in order to automatically discharge the processed product M.

In this embodiment, product-discharging means 15 is provided with generally L-shaped sheet-like member 16 which extends itself along the end wall 6a from the vicinity of the aperture 11 to the vicinity of the main body 15. The sheet-like member 16 is provided with the main sheet member 16a which is removably set to the setting spacers 19 and 20 with screws 17 and 18, inclined member 16b which gently inclines to smoothly guide powdery/granular material when the rotary pan 1 rotates in the normal direction (arrow A) for granulating and coating powdery/granular material, and another inclined member 16c which guides finished product M in a position close to the aperture 11 when the rotary pan 1 inversely rotates (arrow B) for discharging the finished product M.

The sheet-like member 16 of this embodiment has clearances (openings) between the surface of the end wall 6a and the edge 16d (front edge in inverse rotation), a portion 16e close to the main body 5, and another portion 16f close to the aperture 11. Because of this arrangement, when the rotary pan 1 rotates inversely as shown in FIG. 1A by arrow B, the finished product M is led to the portion between the main part 16a and the end wall 6a from the clearances (openings) mentioned above.

As shown in FIG. 1A, the main body 5 is provided with guide member 21 which projects by a certain angle against the direction of the rotation of the rotary pan 1 so that the finished product M can be led to the clearance (opening) at the close portion 16e of the sheet-like member 16 when the rotary pan 1 rotates inversely. This guide member 21 is of generally triangular form in cross section. Thus, finished product M is led to the clearances (openings) of the sheet-like member 16 very effectively. In particular, in the stage where the remainder of the finished product M is decreased, the guide member 21 guides and collects finished products M very effectively.

In this embodiment, the edge 16g of the sheet-like member 16, i.e. the rear edge in reverse rotation (arrow B) of the rotary pan 1 is closed, and thus, the finished product M is smoothly led into the direction of the aperture 11 without spilling granules at all behind the rear edge 16g as the rotary pan 1 inversely rotates, and finally, the finished product M is discharged out of the apparatus. However, the rear edge 16g is not necessarily fully closed, and a slight clearance (opening) may be present if the clearance is less than the minimum length of each granule of the finished product M. According to tests by the inventors, as long as the clearance of the rear edge 16g is less than 0.8 to 0.9 times the minimum length of the granular products M, there was no leakage at all.

Next, operation of the embodiment is described below.

At the start of the granulation and coating of powdery/granular material, an operator first loads powdery/granular raw material in the rotary pan 1, and then rotates the pan 1 in the direction of arrow A shown in FIG. 1A by motor 2 via transmission means 3 and the rotary shaft 4, while gas is supplied from either duct 8 or 10 and exhausted from the other of duct 10 or 8 as required. As a result, powdery/granular material is subjected to tumbling movement which causes the powdery/granular material to be brought up in the direction of the normal rotation (in the direction of arrow A) mainly along the main body 5 and partly along the end walls 6a and 6b while falling to the inward direction. Utilizing this tumbling movement, the desired product M is obtained through granulation, coating, and drying processes.

During the process of granulation and coating where the rotary pan 1 rotates in the normal direction, powdery/granular material or product M tumbles over the product-discharging means 15 which is provided at one or several locations in the circumferential direction of the rotary pan 1. In the rotation in a normal direction, the inclined member 16b becomes the front edge of the sheet-like member 16 in the direction of rotation (in the direction of arrow A). In addition, the front edge of the guide member 21 is also inclined in the direction of the normal rotation. Accordingly, the finished product M can smoothly tumble without incurring cracks and/or breaks.

The front edge 16g of the sheet-like member 16 in the normal-rotation direction, which becomes the rear edge in the inverse rotation direction, is closed or has a clearance (opening) shorter than the minimum length of each product M. Therefore, there is no fear of causing the product M to enter into the hollow portion of product-discharging means 15 while the rotary pan 1 rotates in the normal direction.

After completing the production of product M, the rotary pan 1 is rotated in the inverse direction, i.e., in the direction of arrow B shown in FIG. 1A, by inversely rotating the motor 2 so that the finished product M can be discharged from the rotary pan 1.

Accordingly, the finished product M enters into the clearances between the front edge 16d in the inverse-rotation direction of the sheet-like member 16, the portion 16e close to the hollow main body 5 and the end wall 6a, in other words, product M enters into the hollow portion of product discharging means 15 from the openings, and then, as shown by arrows in FIG. 1A, the finished products M are led to the aperture 11. The finished products M are discharged from the aperture to be unloaded from the rotary pan 1 when product-discharging means 15 arrives, for example, at the above position in the rotating circle of the rotary pan 1, and eventually collected in a container (not shown) like a bag or box. Of course, discharge of product M through product-discharging means 15 can also be done at any timing other than at above position of the rotating circle of the pan 1 by varying the shape and angle of the product-discharging means 15.

In this embodiment, the guide member 21, which is projected and oblique to the direction of normal rotation, is provided at a position close to product-discharging means 15 in the main body 5 so that the finished product M can be smoothly and effectively led to product-discharging means 15 while the rotary pan 1 rotates in the inverse direction. When the remainder of the finished product M becomes small in quantity in the rotary pan 1, the guide member 21 effectively functions to fully and smoothly discharge the product M out of the rotary pan 1.

Example 2

Figure 3:
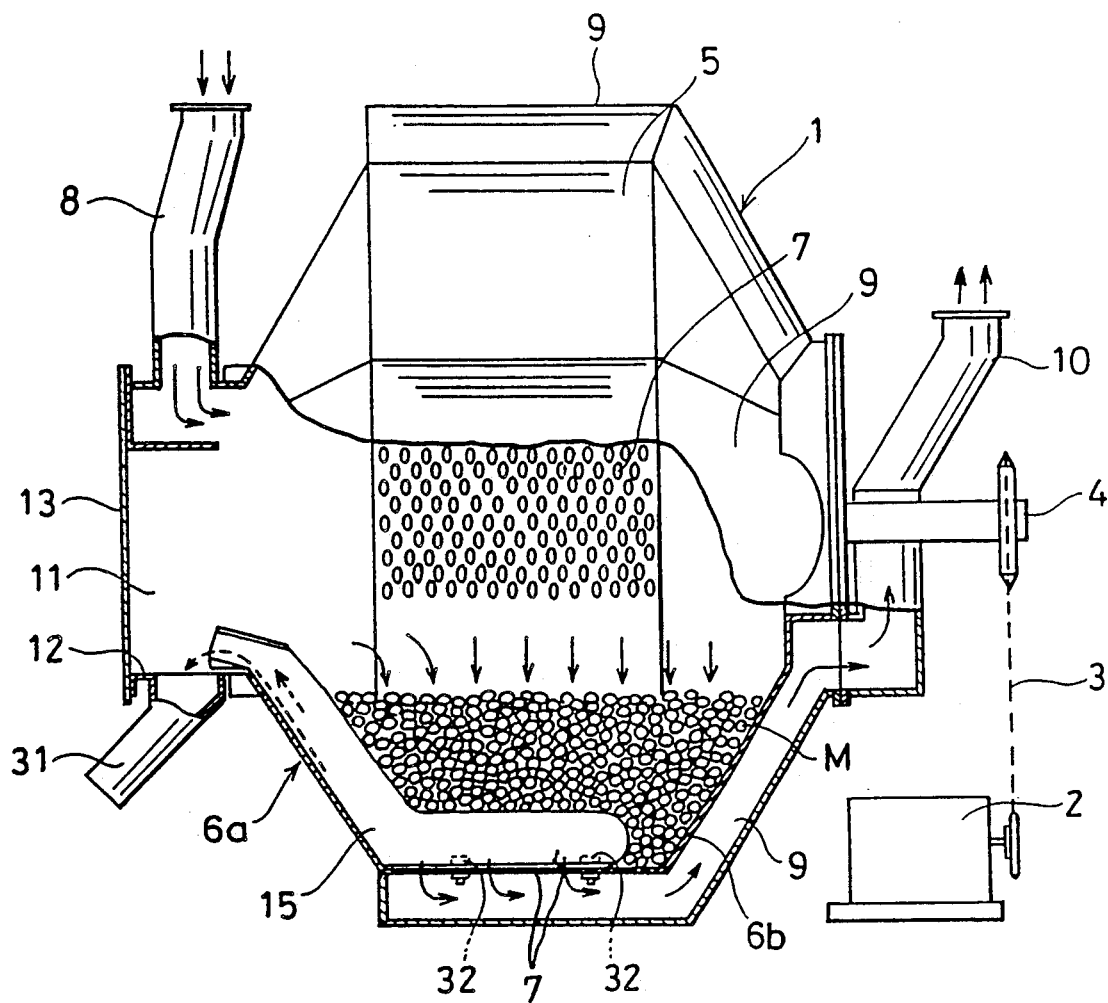
FIG. 3 is an axially-directional section of the powdery/granular material procesing apparatus incorporating another preferred embodiment of product-discharging device according to the invention.
Figure 4:
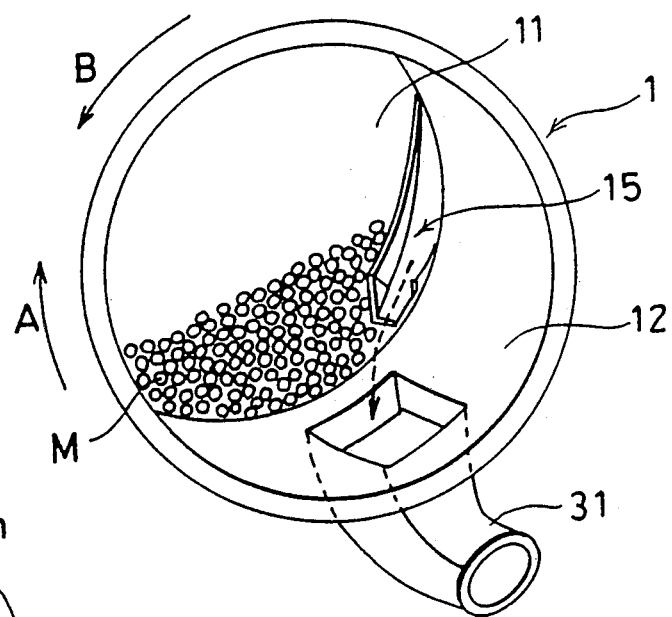
FIG. 4 is a perspective view of a part of the product discharging device of the apparatus shown in FIG. 3.
Figure 5:
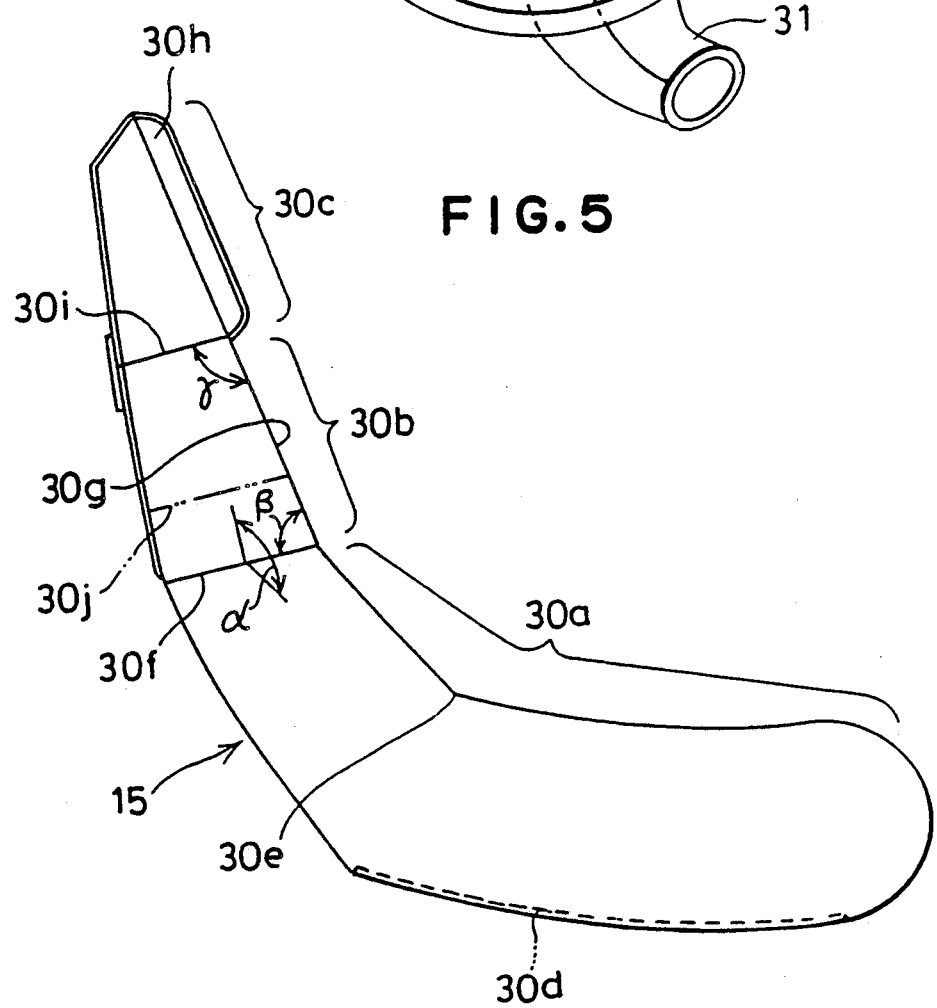
FIG. 5 is the perspective view of a sheet-like product-discharging member as means for discharging products of the embodiment shown in FIG. 3.

FIG. 3 is an axial-directional sectional view of a powdery/granular material processing apparatus incorporating another embodiment of the product-discharging device according to the invention. FIG. 4 is a partial perspective view of the product-discharging device thereof. FIG. 5 is a perspective view of a sheet-like discharging member, i.e. a product-discharging means of this embodiment.

As means for discharging the finished product M from the rotary pan 1 of a powder/granular material processing apparatus, the second embodiment introduces a bent-sheet-like product-discharging member 30 as a product-discharging means 15. In this embodiment, a product-discharging outlet 31 is provided at the bottom surface on the halfway of the mouth portion 12 of the pan 1 so that the finished product M discharged from the rotary pan 1 by the discharging member 30 can be collected into the predetermined container through this product-discharging outlet 31.

As a whole, the sheet-like member 30 has sheet like structure bending itself in the widthwise direction and the plane direction.

The bent-sheet-like discharging member 30 is composed of a base-plate portion 30a by which discharging member 30 is removably and obliquely mounted in the axial direction of the inner surface of the hollow main body 5 of the rotary pan 1 by fixing means 32 like bolts, an interim portion 30b which continuously extends itself along the end wall 6a as shown in FIG. 3 by bending itself in the plane direction by the predetermined angle at the tip of the base plate 30a, and the product discharging part 30c which is connected with the tip of the interim portion 30b and extends itself to the vicinity of the aperture 11 of the rotary pan 1, respectively. The base plate 30a is integrally provided with the setting portion 30d at the bottom edge so that it can be secured to the inner surface of the main body 5 with bolt 32. The setting portion 30d is provided at a predetermined angle with the main surface of the base-plate 30a, and thus, when installing the setting portion 30d to the inner surface of the main body 5 of the rotary pan 1, the main surface of the base plate 30a is obliquely set against the inner surface of the main body 5 at the predetermined inclined angle. Accordingly, the bent-sheet-like discharging member 30 can effectively serve for granulation, coating, agitation, and drying of powdery/granular material when the rotary pan 1 rotates in the normal direction (in the direction of arrow A in FIG. 4). The base-plate 30a bends itself in the widthwise direction at position 30e which is rather close to the tip portion of the base plate 30a.

At the time of the discharge, after the base plate 30a collects the products M, the interim portion 30b leads the collected products in the discharging direction. The interim portion 30b bends itself at the bending line 30f in the border with the tip of the base plate 30a by an obtuse angle. In this embodiment, the interim portion 30b bends itself at 141° corresponding to the angle α. Further, in this embodiment, the bending line 30f is set against one of the edges 30g of the interim portion 30b at 94.5° of the angle β. The interim portion 30b may also be bent by 141° of obtuse angle even when it is set at any position other than the bending line 30f as shown in FIG. 5 by means of two-dot chained line 30j.

Further, the discharging portion 30c leads the product M from the base-plate 30a to the product discharging outlet 31 via the interim portion 30b. As shown in FIG. 3, the tip of the discharging portion 30c extends to the position above the opening of the product-discharging outlet 31. Upright guide wall 30h is erected at one edge part of the product-discharging portion 30c, i.e., at the rear edge portion in the inverse-rotation direction (in the direction of arrow B in FIG. 4) of the rotary pan 1. The upright guide wall 30h guides the finished product M conveyed from the interim portion 30b to the discharging portion 30c to the product-discharging outlet 31 without spilling even the slightest amount of the products M into the rotary pan 1. Borderline 30i between the interim portion 30b and the discharging portion 30c is set against the edge 30g of the interim portion 30b with angle γ of 90° for example.

Next, operation of the embodiment is described below.

Before granulating and coating powdery/granular material, raw material is fed to the rotary pan 1, and then the roatary pan 1 is rotated in the direction of arrow A (in the normal direction) shown in FIG. 4 by motor 2 via transmission means 3. Then, heated air is fed to the roatary pan 1 via duct 8 or 10 as required and gas is exhausted from another of these ducts. While the rotary pan 1 rotates in the normal direction A, neither the material nor the product can be led from product-discharging means 15 to the aperture 11. While the operation of granulation, coating, and drying, powdery/granular material in the rotary pan 1 tumbles along the inside of the main body 5 and end walls 6a and 6b.

The base-plate 30a of the product-discharging means 15 projects inside of the rotary pan 1 by the predetermined inclined angle. This effectively serves as baffle for the granulation, coating, agitation and drying of powdery/granular material.

When discharging the finished product M from the rotary pan 1, the operator reverses the rotation of motor 2 so that the rotary pan 1 can rotate in the inverse direction (in the direction of arrow B in FIG. 4). As a result, the finished product M is led to the back of the product-discharging means 15. As shown in FIGS. 3 and 4 by means of the arrowed broken lines, the finished product M is smoothly led from the base-plate 30a to the mouth portion 12 through the interim portion 30b and the discharging portion 30c. And then, when product discharging means 15 arrives at the position above the rotating circle of the rotary pan 1 for example, the finished product M falls and moves out of the product-discharging outlet 31 to be eventually collected in the container (not shown).

In addtion to the product-discharging means 15 employed in this embodiment featuring a simple structure and inexpensive cost of, it can effectively serve for implementing granulation, coating, agitation, and drying of powdery/granular material during normal operation.

It should be understood however that the scope of the invention is by no means confined to those embodiments described above, but the invention also provides wide variations as well.

For example, in addition to the drum shape, the rotary pan may also be of a pear-shape or an onion-shape and can have the an inclined axial line for rotation.

In addition to the inclined end wall 6a, product-discharging means 15 may also employ a vertical wall, i.e., a wall having a right angle against the direction of the rotation of the rotary pan 1 may also be used. Further, any kind of the sectional shape may also be optionally employed for the end wall 6a.

As shown in FIG. 2 by the two-dot chained line, the product-discharging means 15 of the first embodiment may also be provided projecting outside of the rotary pan 1.

It is also possible for the first embodiment to introduce a product-discharging means 15 which is composed of the inclined portion 16b constantly being open and a sheet-like member (not shown) provided to the member 16d, this sheet-like member being driven by a torque actuator so that it can be opened and closed and disclosed against the end wall 6a. When the pan-coating is underway, the sheet-like member is operated in the open condition to form an opening between the sheet-like member and the end wall 6a. After processing the product M, the sheet-like member is made to close the opening formed by the end wall 6a in order that the finished product M can be discharged without changing the direction of the rotation of the rotary pan 1.

The present invention has the following advantageous effects.

(a) The powdery/granular material processing apparatus according to the invention incorporates a rotary pan which is composed of a hollow main body rotating itself around the axial line, end wall portion which closes opposite ends of the hollow main body in the axial direction, and an aperture which is provided at least at one of the end wall. The apparatus is provided with product-discharging means which extends along the end wall from the interior of the rotary pan to the vicinity of the aperture to lead the finished product form the interior of the rotary pan to the aperture so that the finished product can easily and automatically be discharged from the apparatus.

(b) By virture of the structure mentioned above, the finished product can be prevented from incurring unwanted trouble like pulverization of finished products and/or stripping of coating layer of the products.

(c) Since the product-discharging means is free from interfering in the washing operation and adhesion of residual material, the product-discharging means can be prevented from incurrng stain and adhesion of contaminated matter, thus significantly promoting sanitary condition.

(d) Since the sheet-like member can easily be removed, washing and subsequent evaluation of the washing effect can easily be done.

(e) The product-discharging means is of simple structure and inexpensive.

(f) By virture of the simple structure and inexpensive cost of the product-discharging means, the height of the entire apparatus can be lowered thereby preventing the product from falling.

What is claimed is:

1. A product-discharging device of a powdery/granular material processing apparatus comprising:
a rotary pan which consists of a hollow main body adapted to rotate about an axis, end wall portions which close opposite end sides of said main body in the axial direction, and an aperture which is provided at least in one of said end wall portions; and
product-discharging means which extends along said one end wall portion from the interior of said rotary pan to the vicinity of said aperture to guide product inside of said rotary pan to said aperture when the rotary pan rotates, said product-discharging means comprises a hollow portion defined by a sheet-like member extending along said one end wall portion from the vicinity of said main body to said aperture;
a portion of the product-discharging means close to said aperture, and at least one of a portion of the product-discharging means close to the main body and a front-edge portion of the product-discharging means at the time of product discharging define an opening of said hollow portion; and,
the rear-edge portion of the product-discharging means at the time of product discharging is closed or has a clearance which at least has a dimension less than that of said product.

2. The product-discharging device according to claim 1, wherein:
said rotary pan is capable of rotating in the normal and inverse directions.

3. The product-discharging device according to claim 1, wherein:
said main body is provided with a guide member guiding product to said opening of the product-discharging means when the rotary pan rotates.

4. A product-discharging device of a powdery/granular material processing apparatus comprising:
a rotary pan which consists of a hollow main body adapted to rotate about an axis, end wall portions which close opposite end sides of said main body in the axial direction, and an aperture which is provided at least in one of said end wall portions; and
product-discharging means which extends along said one end wall portion from the interior of said rotary pan to the vicinity of said aperture to guide product inside of said rotary pan to said aperture when the rotary pan rotates, said rotary pan is capable of rotating in the normal and inverse directions; and
said product-discharging means comprises a sheet-like member which extends along said one end wall portion from said main body to the vicinity of said aperture;
said sheet-like member serves for granulation, coating, and agitation of powdery/granular material in said rotary pan when said rotary pan rotates in the normal direction and then guides the product from said rotary pan to said aperture to discharge the product when said rotary pan rotates in the inverse direction; and
said sheet-like product-discharging member comprises a base plate which is disposed in the axial direction of said main body of the rotary pan and whose tip portion bends in the widthwise direction; an interim portion which bends in the plane direction by obtuse angle against the tip of said base plate; and a discharging portion which extends itself from the tip of said interim portion to the vicinity of said aperture of the rotary pan and is provided at the rear edge of the discharging-portion at the time of inverse rotation of the rotary pan with an upright guiding wall for guiding product.

* * * * *